(12) United States Patent
Iida (10) Patent No.: US 7,922,613 B2
(45) Date of Patent: Apr. 12, 2011

(54) ELECTRIC ACTUATOR

(75) Inventor: Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 452 days.

(21) Appl. No.: 11/690,142

(22) Filed: Mar. 23, 2007

(65) Prior Publication Data

US 2007/0234832 A1 Oct. 11, 2007

(30) Foreign Application Priority Data

Mar. 30, 2006 (JP) ................................ 2006-094047

(51) Int. Cl.
*F16H 7/18* (2006.01)
*F16H 27/02* (2006.01)

(52) U.S. Cl. ........ 474/140; 474/144; 474/146; 474/148; 474/253; 474/257; 74/89.32; 74/89.22; 74/490.09; 384/26; 384/35; 384/39; 384/42; 384/45

(58) Field of Classification Search .................. 474/140, 474/253, 144–146; 74/89.22, 89.21, 89.12, 74/89.17, 526, 527, 531; 310/12, 12.01, 310/13; 384/8, 42, 44, 45

See application file for complete search history.

(56) References Cited

U.S. PATENT DOCUMENTS

| | | | |
|---|---|---|---|
| 5,125,281 A | 6/1992 | Mottate | |
| 5,131,125 A * | 7/1992 | Coron | 29/33 P |
| 5,445,045 A * | 8/1995 | Nagai et al. | 74/490.09 |
| 6,461,046 B2 * | 10/2002 | Kahl | 384/40 |
| 6,584,868 B2 * | 7/2003 | Wu et al. | 74/89.32 |
| 7,062,985 B2 * | 6/2006 | Bauer | 74/89.32 |
| 7,220,198 B2 | 5/2007 | Iida | |
| 2003/0224890 A1 | 12/2003 | Nagai et al. | |
| 2004/0065162 A1* | 4/2004 | Iida | 74/89.2 |
| 2005/0054468 A1* | 3/2005 | Nagai et al. | 474/148 |

FOREIGN PATENT DOCUMENTS

| | | |
|---|---|---|
| DE | 3336496 | 8/1989 |
| DE | 4040510 | 7/1991 |
| DE | 10346450 | 4/2004 |
| EP | 0448485 | 3/1991 |
| JP | 8-226514 | 9/1996 |

* cited by examiner

*Primary Examiner* — Robert A Siconolfi
*Assistant Examiner* — San Aung
(74) *Attorney, Agent, or Firm* — Paul A. Guss (57) ABSTRACT

A hollow yoke is inserted into a bore section of a frame. The yoke is connected to a slider via a slit in the frame. A timing belt is inserted into a belt hole of the yoke. Further, a pair of guide members are provided on both side surfaces of the yoke, which engage with guide grooves of the frame. The yoke is displaced along the guide grooves by the timing belt, under a driving action of a driving section. Accordingly, the slider is displaced in the axial direction along the frame.

7 Claims, 8 Drawing Sheets

ELECTRIC ACTUATOR

BACKGROUND OF THE INVENTION

1. Field of the Invention

The present invention relates to an electric actuator for moving a displacement member by transmitting a driving force of a driving section to the displacement member via a driving force-transmitting belt.

2. Description of the Related Art

An electric actuator, which displaces a slider in order to transport a workpiece or the like, by driving a belt by means of a rotary driving force of a rotary driving source such as a motor, has been hitherto widely used as a workpiece-transporting apparatus.

In recent years, an electric actuator having a thin type of structure has been developed, in which a height dimension of the electric actuator is suppressed, taking into account demands of the installation space as well as the environment of use of the electric actuator.

Such an electric actuator comprises, for example, a guide rail disposed in an axial direction along a central portion of a housing, and a guide block, which is slidably displaceable along the guide rail, wherein a slide block is connected to an upper portion of the guide block. Further, a transmitting belt moves orbitally inside the housing, such that the transmitting belt surrounds the outer sides of the guide rail, wherein the transmitting belt is connected to the slide block. When the transmitting belt is driven by a driving source, the slide block is displaced along the guide rail.

In a conventional technique disclosed in Japanese Laid-Open Patent Publication No. 8-226514, a guide rail and a transmitting belt are arranged substantially in parallel in the horizontal direction inside a housing, with the intention of miniaturizing a height dimension of the electric actuator. On the other hand, the widthwise dimension of the housing is inevitably increased, and the electric actuator consequently has a large size in the widthwise direction, since the transmitting belt is arranged so as to surround the outer sides of the guide rail.

In another viewpoint, it may be conceived that the widthwise dimension of the guide rail should be made large in size in order to facilitate rectilinear movement performance when the guide block and the slide block are displaced. However, in this case, the housing inevitably becomes large in size, because the transmitting belt is arranged on the outer sides of the guide rail. Thus, it is difficult to obtain a desired widthwise dimension of the guide rail while the widthwise dimension of the electric actuator itself is suppressed. Therefore, for example, when an external force is applied in the moment direction with respect to the slide block, the slide block cannot be smoothly displaced along the housing in some situations.

SUMMARY OF THE INVENTION

A general object of the present invention is to provide an electric actuator, in which the actuator can be successfully miniaturized while suppressing both the height and widthwise dimensions thereof, as well as to provide a displacement member that can be displaced reliably and smoothly even when an external force is applied to the displacement member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
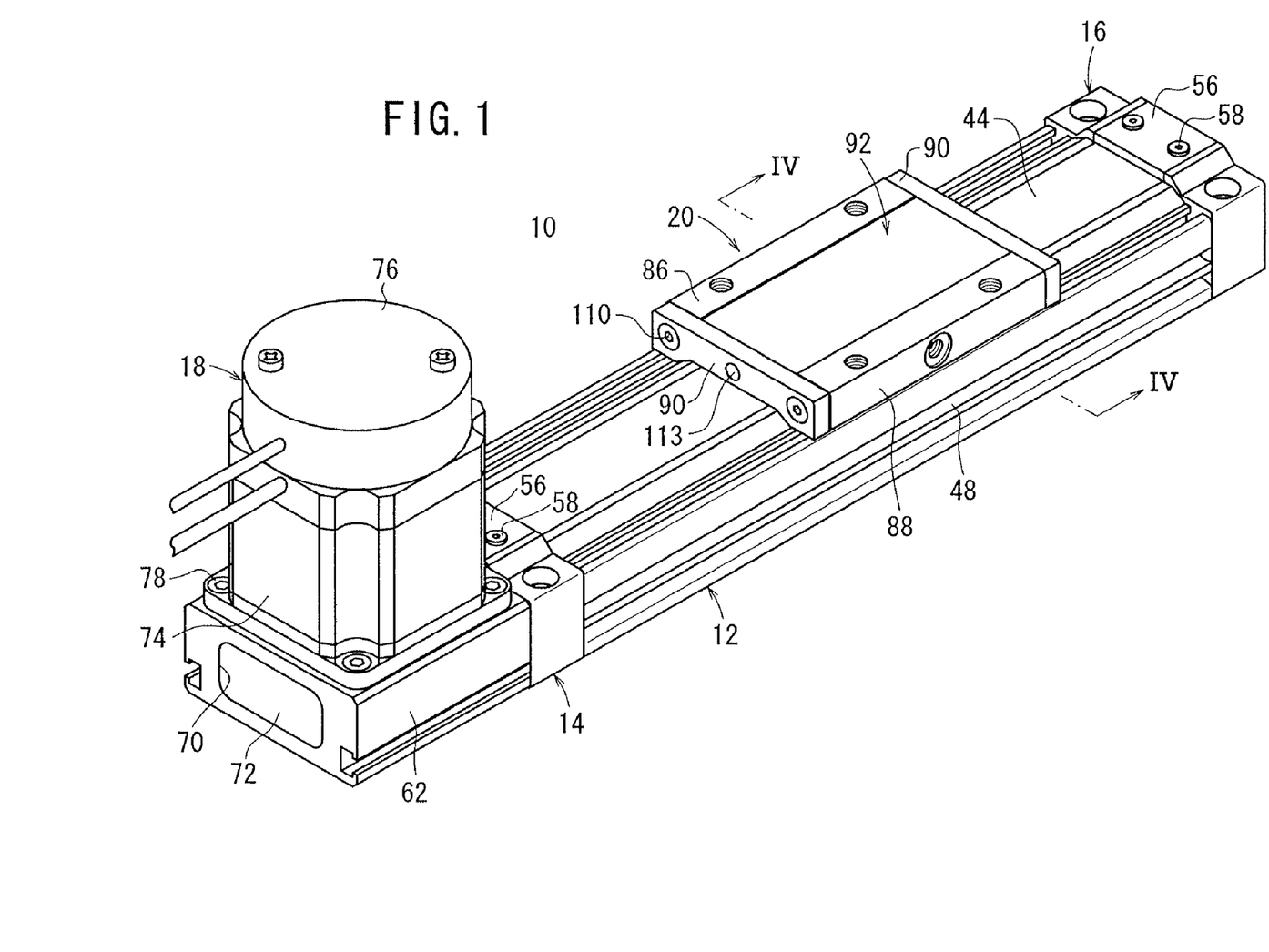
FIG. 1 is a perspective view illustrating an electric actuator in its entirety, according to an embodiment of the present invention.

With reference to FIG. 1, reference numeral 10 indicates an electric actuator according to an embodiment of the present invention.

As shown in FIGS. 1 to 4, the electric actuator 10 comprises a frame 12 that is elongated in an axial direction, a pair of first and second end blocks 14, 16 connected to both end portions of the frame 12, a driving section 18 connected to the first end block 14 and which is driven in accordance with an electric signal, a slider (displacement member) 20 that transports a workpiece (not shown), and a timing belt (driving force-transmitting belt) 24, which transmits a driving force to the slider 20 through a driving pulley 22 connected to the driving section 18.

The electric actuator 10 further comprises a belt-adjusting mechanism 26, which is capable of adjusting the tensile force of the timing belt 24, along with a belt-fixing mechanism 28 (see FIG. 5), which fixes the ends of the timing belt 24 to the belt-adjusting mechanism 26.

Figure 2:
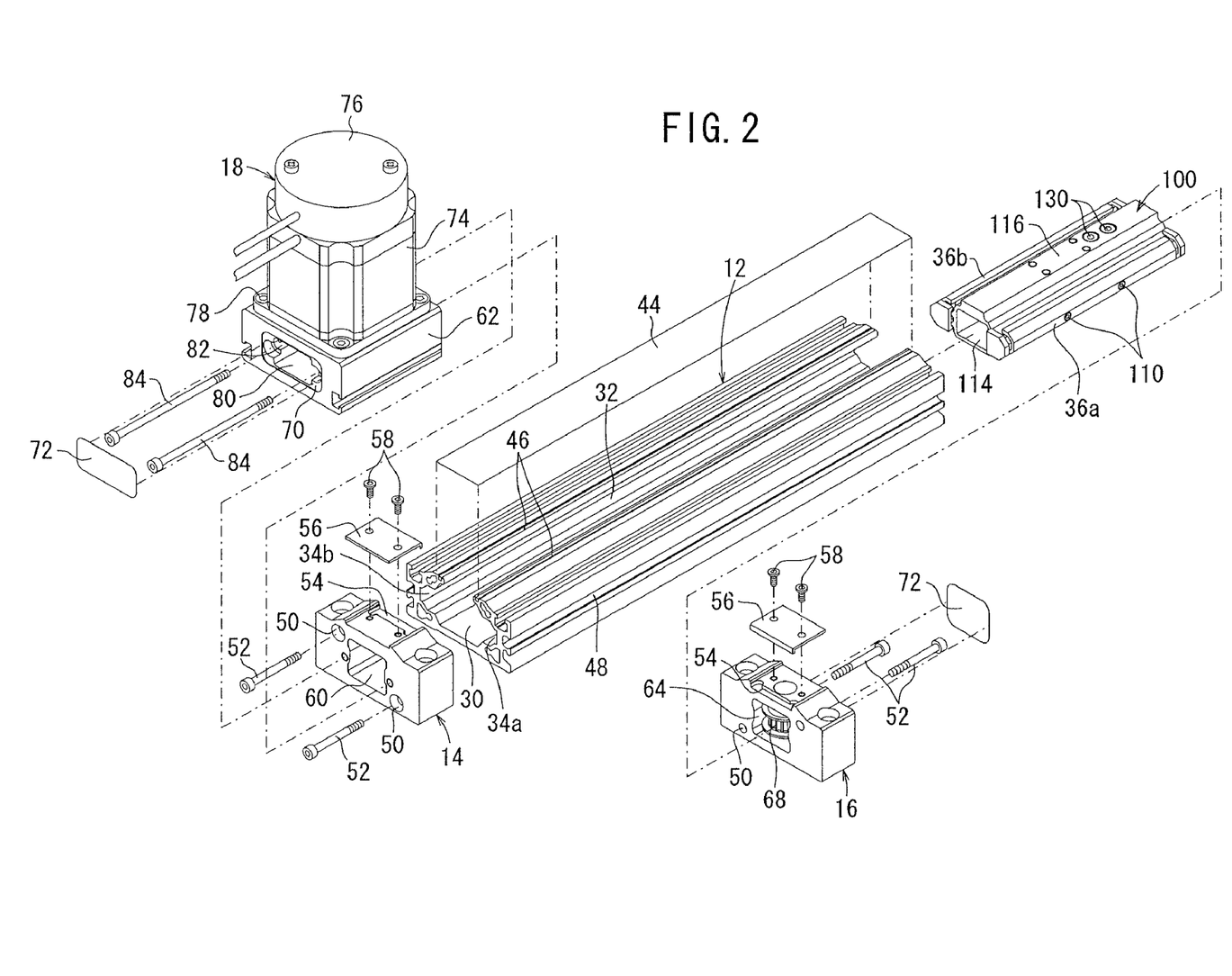
FIG. 2 is a partial exploded perspective view illustrating the electric actuator shown in FIG. 1.
Figure 3:
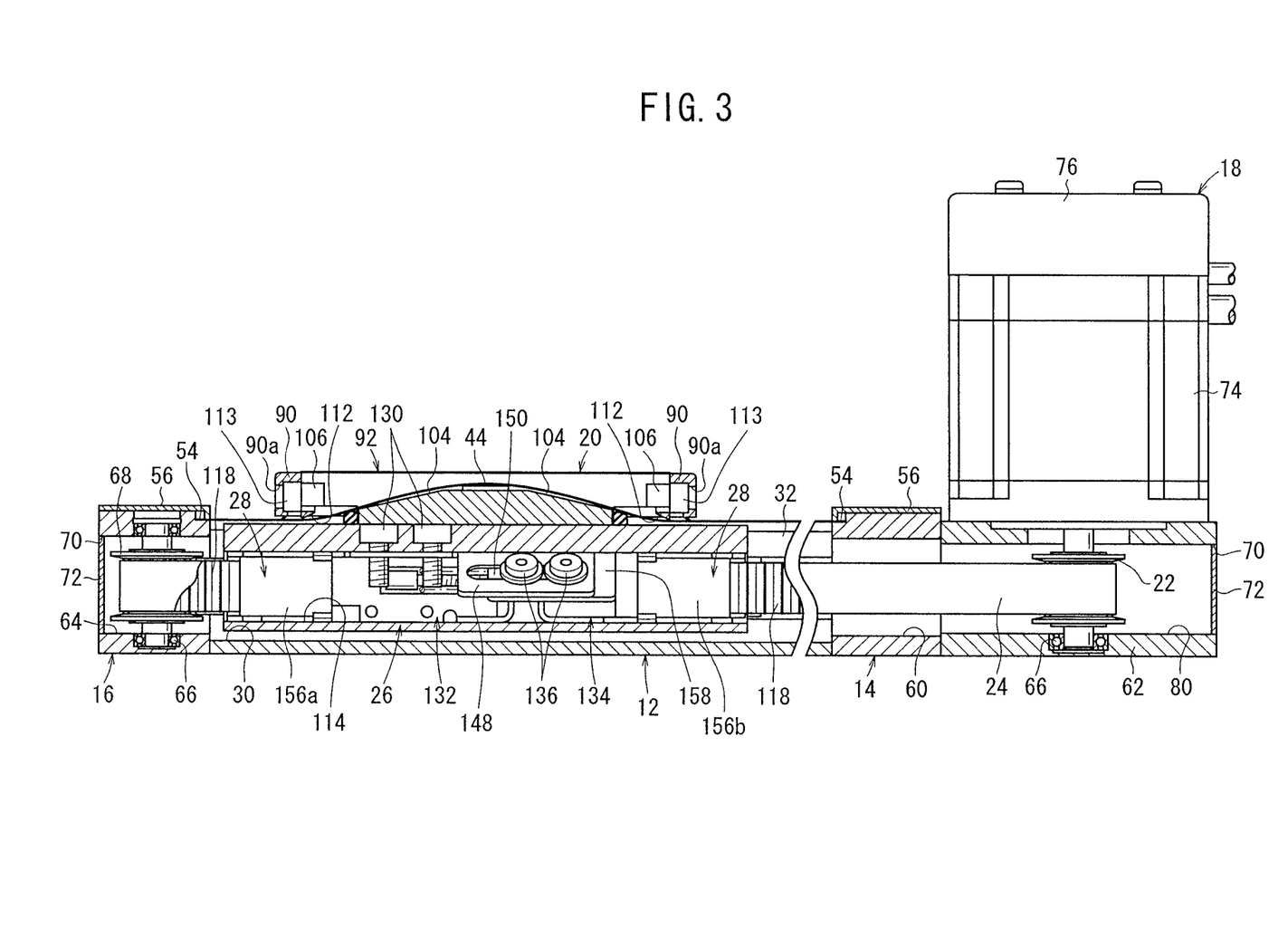
FIG. 3 is a longitudinal sectional view illustrating the electric actuator shown in FIG. 1.

As shown in FIGS. 2 and 3, the frame 12 is formed with a hollow shape, having a bore section 30 provided therein extending in the axial direction. A slit 32, which is open in the axial direction, is formed on an upper surface of the frame 12. The bore section 30 communicates with the outside via the slit 32.

Figure 4:
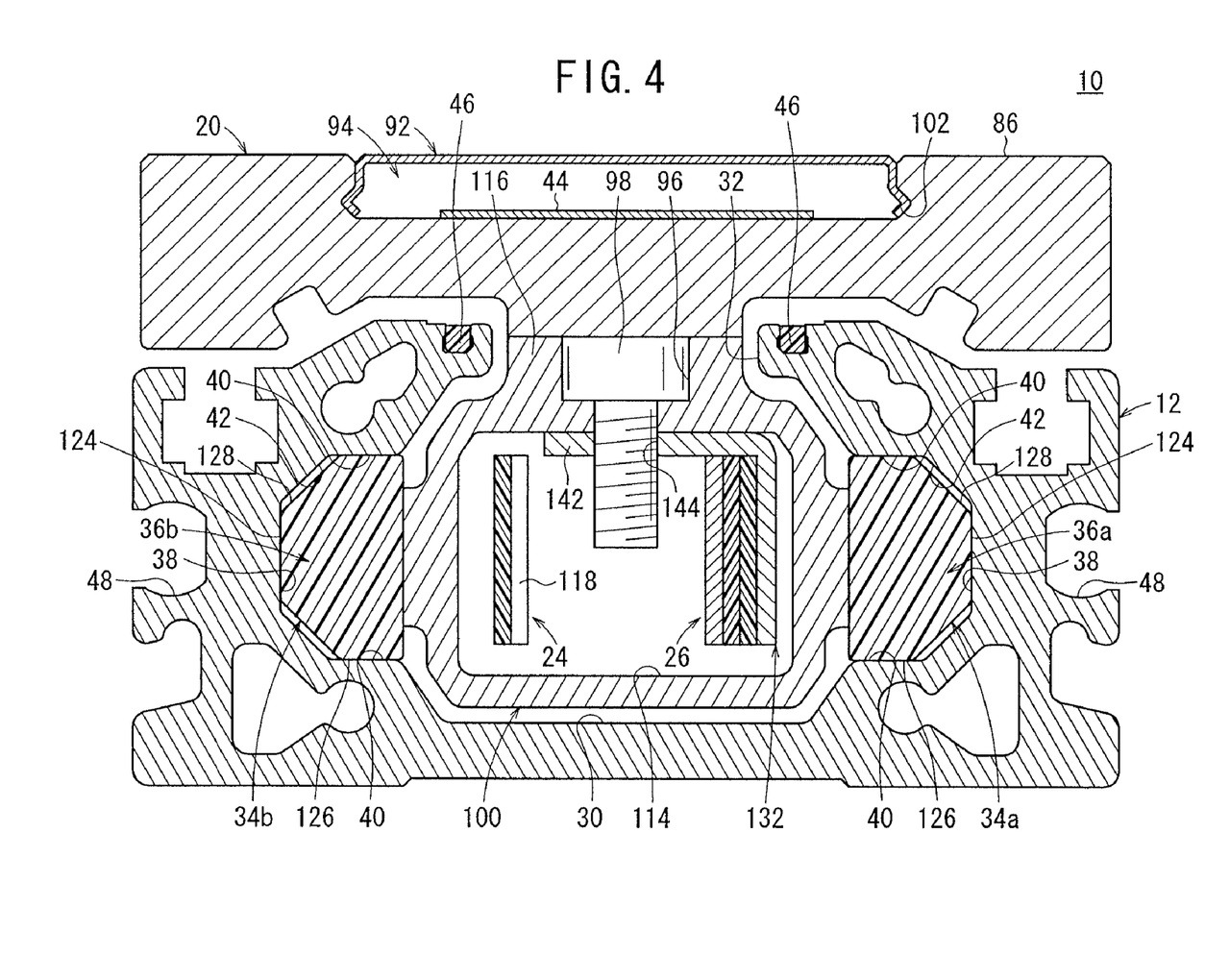
FIG. 4 is a vertical sectional view taken along line IV-IV shown in FIG. 1.

A pair of guide grooves 34a, 34b, which are recessed toward both side surfaces of the frame 12, extend in the axial direction inside the bore section 30. Guide members 36a, 36b are inserted into the guide grooves 34a, 34b, as described later on. As shown in FIG. 4, each of the guide grooves 34a, 34b is composed of a vertical surface 38, the respective vertical surfaces 38 being formed on each of both side surfaces of the frame 12, a pair of horizontal surfaces 40, which are disposed substantially perpendicular to the vertical surfaces 38, and a pair of inclined surfaces 42, which are formed between the vertical surfaces 38 and the horizontal surfaces 40.

A seal belt 44, which seals the slit 32 by closing the slit 32 at an upper position thereof, is attached to the slit 32. The seal belt 44 is formed, for example, from a metal material having a sheet-shaped form. A pair of magnetic members 46 (for example, permanent magnets) are installed on both sides of the slit 32 into grooves that extend in the axial direction. The seal belt 44 is attracted by magnetic forces produced by the magnetic members 46. Accordingly, the slit 32 is closed at the upper position of the slit 32 (see FIG. 1), making it possible to avoid invasion of dust or the like, which otherwise would invade into the bore section 30 via the slit 32.

Both ends of the seal belt 44 are fixed respectively to the pair of first and second end blocks 14, 16 that are connected to both ends of the frame 12 respectively.

On the other hand, a pair or plural pairs of sensor attachment grooves 48 are formed in the axial direction on both side surfaces of the frame 12. A position-detecting sensor (not shown) is installed in one or more of the sensor attachment grooves 48, in order to detect the displacement position of the slider 20.

The first and second end blocks 14, 16 are disposed respectively at both end portions of the frame 12, so that the bore section 30 is closed. Bolts 52 are inserted into bolt installation holes 50 that are formed through the first and second end blocks 14, 16. The first and second end blocks 14, 16 are integrally assembled to both end portions of the frame 12, respectively, by means of the bolts 52.

Belt grooves 54, into which ends of the seal belt 44 are inserted, are formed on upper portions of the first and second end blocks 14, 16. After the ends of the seal belt 44 have been inserted, presser covers 56 then are installed into the belt grooves 54 at upper positions thereof. The presser cover 56 has a substantially L-shaped cross section, protruding toward the seal belt 44. The presser cover 56 is fixed by two fixing screws 58 to each of the first and second end blocks 14, 16. Accordingly, the ends of the seal belt 44 are fixed respectively to the first and second end blocks 14, 16.

The first end block 14 is connected to one side end of the frame 12. A first penetrating hole 60, having a substantially rectangular cross section, is formed in the axial direction. The timing belt 24 is inserted into the first penetrating hole 60. A base member 62 of the driving section 18 is connected to an end surface of the first end block 14, the end surface being disposed on the side that is opposite to the end surface to which the frame 12 is connected. Stated otherwise, the first end block 14 is interposed between the driving section 18 and the frame 12.

On the other hand, the second end block 16 is connected to the other side end of the frame 12. A second penetrating hole 64, which has a substantially rectangular cross section, is formed in an axial direction in the second end block 16. The timing belt 24 is inserted into the second penetrating hole 64. Further, a driven pulley 68 is rotatably supported in the second penetrating hole 64 by a pair of bearings 66, wherein the timing belt 24 runs over the driven pulley 68.

A plate installation hole 70, which is larger than the second penetrating hole 64, also is formed on the end surface of the second end block 16. The plate installation hole 70 has a substantially rectangular shape. A thin plate-shaped plate 72, which has approximately the same shape as that of the plate installation hole 70, is installed therein, so as to close the second penetrating hole 64.

The driving section 18 includes a rotary driving source 74 composed of, for example, a stepping motor, a base member 62, which is installed on a lower portion of the rotary driving source 74, and a detecting section 76 that detects an amount of rotation of the rotary driving source 74. The rotary driving source 74 is connected to the base member 62 by bolts 78. A driving pulley 22 is connected to the end of the rotary driving source 74. The driving pulley 22 is inserted into the base member 62, and is rotatably supported by bearings 66.

A third penetrating hole 80 having a substantially rectangular cross section that penetrates in the axial direction is formed at a substantially central portion of the base member 62. The timing belt 24 is inserted into the third penetrating hole 80 and runs over the driving pulley 22.

A pair of bolt grooves 82, which are substantially semicircular in cross section and recessed by predetermined depths, extend in the axial direction on an inner surface of the third penetrating hole 80. Connecting bolts 84 are inserted into the pair of bolt grooves 82. More specifically, the base member 62 is connected to the first end block 14 by the connecting bolts 84, and accordingly, the base member 62 is integrally connected to the frame 12.

A plate installation hole 70, which is slightly recessed as compared with the end surface of the base member 62, is formed on one side end of the base member 62. The plate installation hole 70 is substantially rectangular in shape such that the third penetrating hole 80 is included therein. A thin plate-shaped plate 72, which has approximately the same shape as that of the plate installation hole 70, is installed therein, so as to close the third penetrating hole 80, into which the connecting bolts 84 are inserted (see FIG. 1).

The slider 20 includes a main body section 88, which has table surfaces 86 for placing an unillustrated workpiece thereon, a pair of end covers 90 installed to both end portions of the main body section 88 respectively, and a cover plate 92, which covers a portion of the main body section 88.

More specifically, the main body section 88 is provided with table surfaces 86, which are formed to be flat on both side portions of the main body section 88, and a recess 94 that is recessed by a predetermined depth at a substantially central portion between the table surfaces 86. A plurality of bolt holes 96, which penetrate in a direction away from the table surfaces 86, are formed in the recess 94. A yoke (guide member) 100 is connected to a lower portion of the main body section 88 by 98, which are inserted into the bolt holes 96.

The recess 94 is closed by the cover plate 92, which is installed at an upper position. The cover plate 92 and the table surfaces 86 are disposed substantially within the same plane. Therefore, the workpiece can be placed on the upper surface of the slider 20 made up of the cover plate 92 and the table surfaces 86.

Engaging sections 102, having expanded widths, are formed at respective ends of the cover plate 92. The engaging sections 102 engage within the recess 94. Accordingly, the cover plate 92 is integrally installed onto the main body section 88.

The recess 94 includes a pair of guide surfaces 104, which gradually incline toward both ends of the main body section 88, from a starting point of a substantially central portion of the recess 94. The guide surfaces 104 are inclined at predetermined angles so as to gradually separate from the table surfaces 86 toward both ends. The seal belt 44, which is installed in the slit 32 of the frame 12, is inserted into the recess 94 along the pair of guide surfaces 104 (see FIG. 3).

The end covers 90 are installed to respective side portions at both ends of the main body section 88, with spacers 106 interposed therebetween. The end covers 90 are fixed by bolts 110 through a pair of collars 108. Further, belt-holding sections 112, which protrude toward the main body section 88, are inserted into the recess 94. Specifically, the seal belt 44 is inserted into a space between the cover plate 92 and the guide surfaces 104 of the recess 94, whereby the seal belt 44 is guided in a downward direction toward the frame 12 by the belt-holding sections 112 of the cover plate 92.

Columnar stoppers 113 are installed into holes 90a that penetrate through substantially central portions of the end covers 90, respectively. The stoppers 113 are provided so as to face the outside of the end covers 90. For example, when a stopper block (not shown) is provided on the frame 12 at a displacement terminal end position of the slider 20, displacement of the slider 20 is regulated such that the stopper 113 abuts against the stopper block upon displacement of the slider 20. When the stopper 113 is formed of an elastic material, impacts exerted on the slider 20 are buffered upon abutment of the stopper 113 against the stopper block.

The yoke 100 includes a belt hole 114, which has an open cylindrical shape having a substantially rectangular cross section, and which penetrates in the axial direction. The yoke 100 further includes an expanded section 116, which protrudes upwardly and is connected to the slider 20. The expanded section 116 is connected to the main body section 88 of the slider 20 via the slit 32, in a state in which the yoke 100 is inserted into the bore section 30 of the frame 12.

The timing belt 24 is inserted in an axial direction into the belt hole 114. Further, the belt-adjusting mechanism 26, which is used to adjust the tensile force of the timing belt 24, also is installed to the belt hole 114. The timing belt 24 is arranged along inner wall surfaces of the belt hole 114, such that parallel teeth 118 thereof are mutually opposed to one another.

Figure 5:
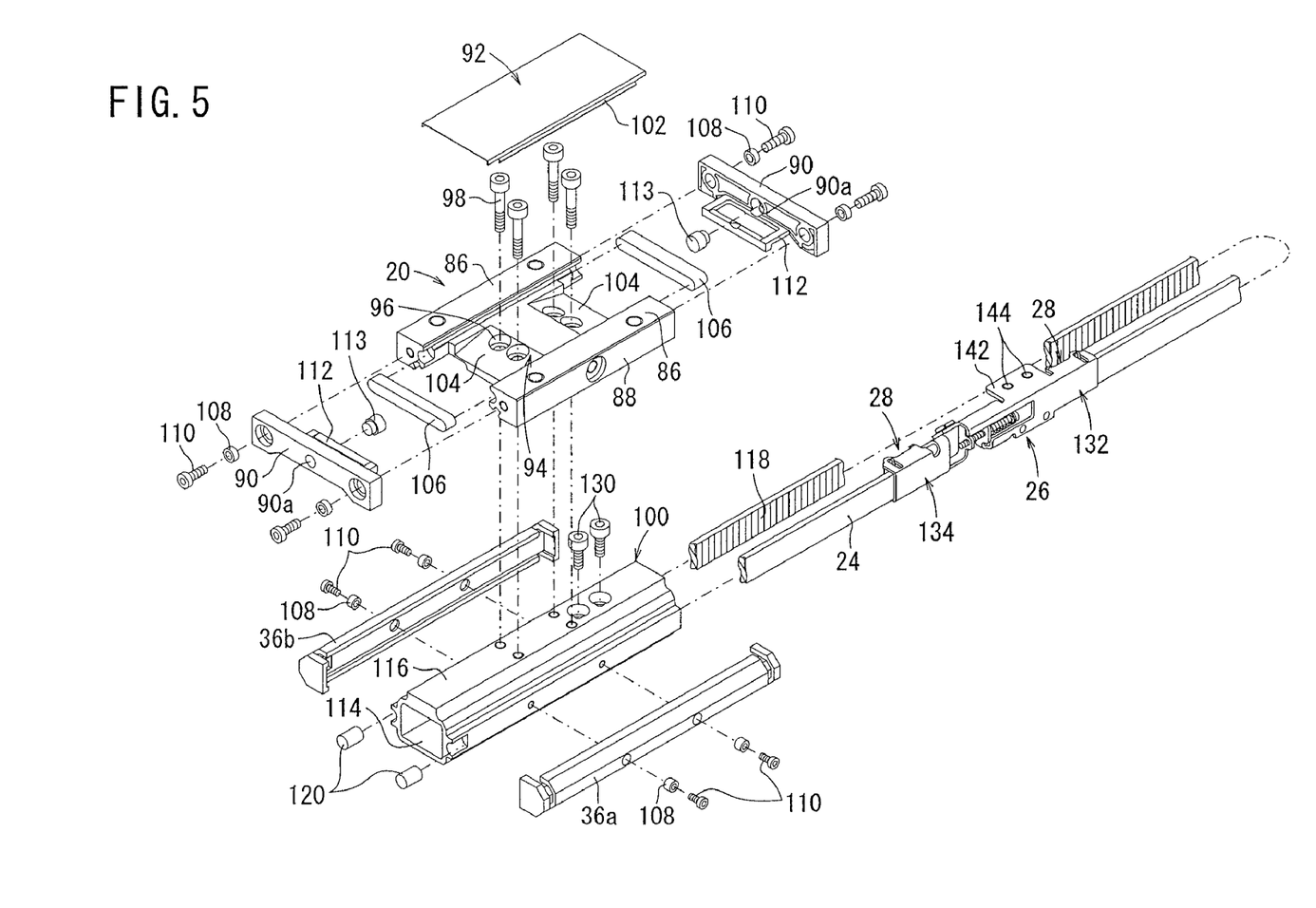
FIG. 5 is an exploded perspective view illustrating a slider and a yoke of the electric actuator shown in FIG. 1.
Figure 6:
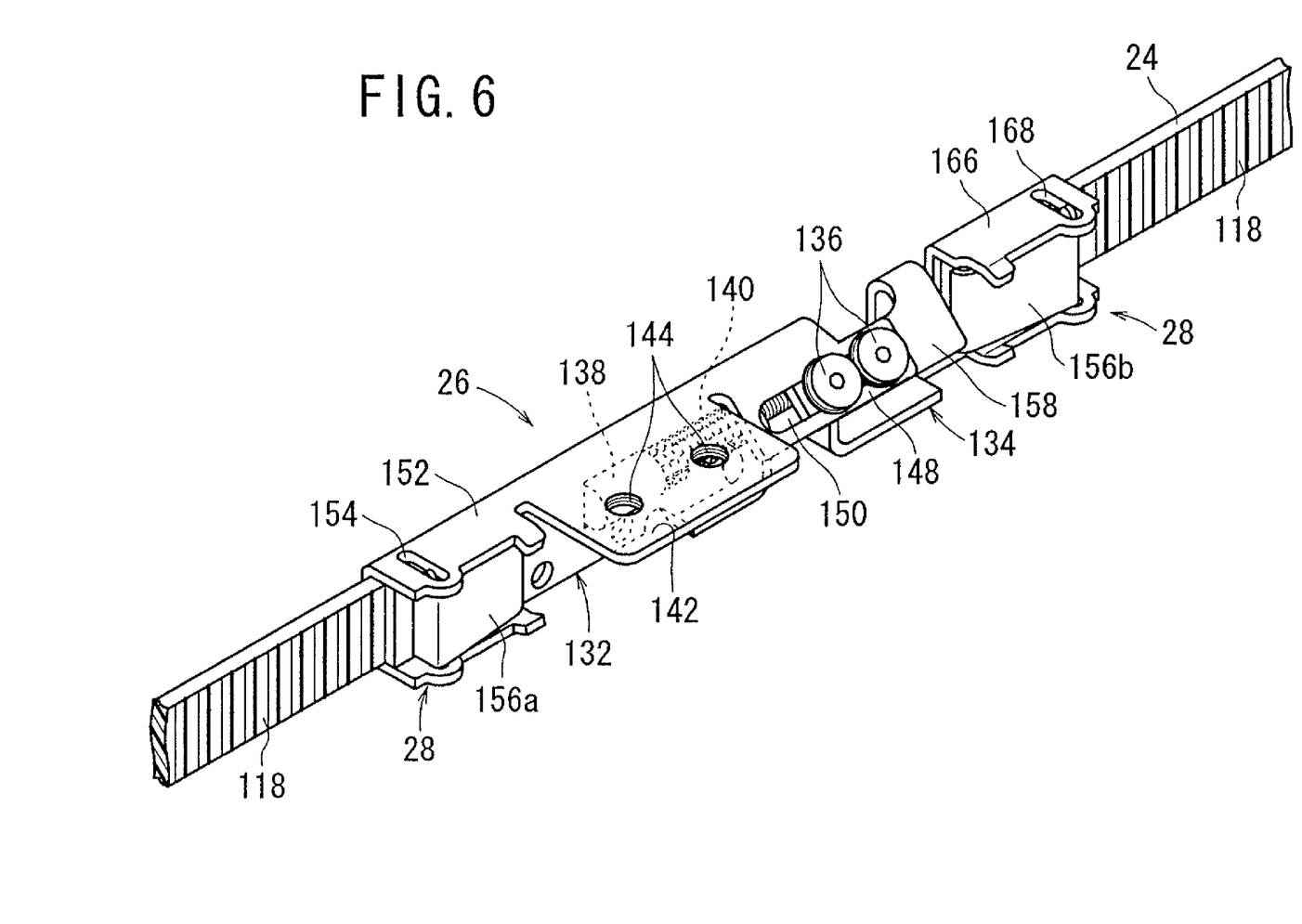
FIG. 6 is a perspective view illustrating a belt-adjusting mechanism shown in FIG. 5, as viewed from a different direction.
Figure 7:
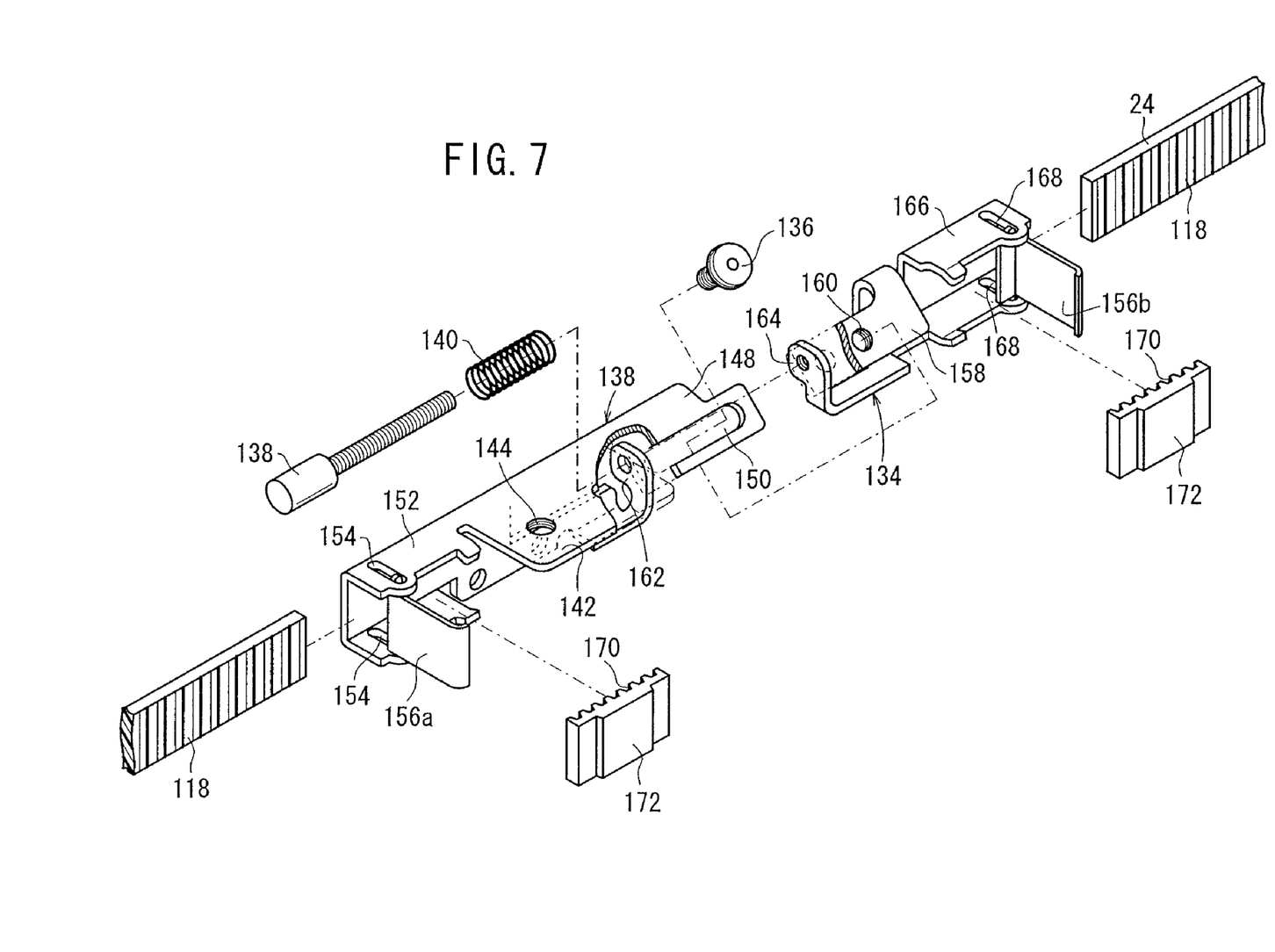
FIG. 7 is an exploded perspective view illustrating the belt-adjusting mechanism shown in FIG. 6.
Figure 8:
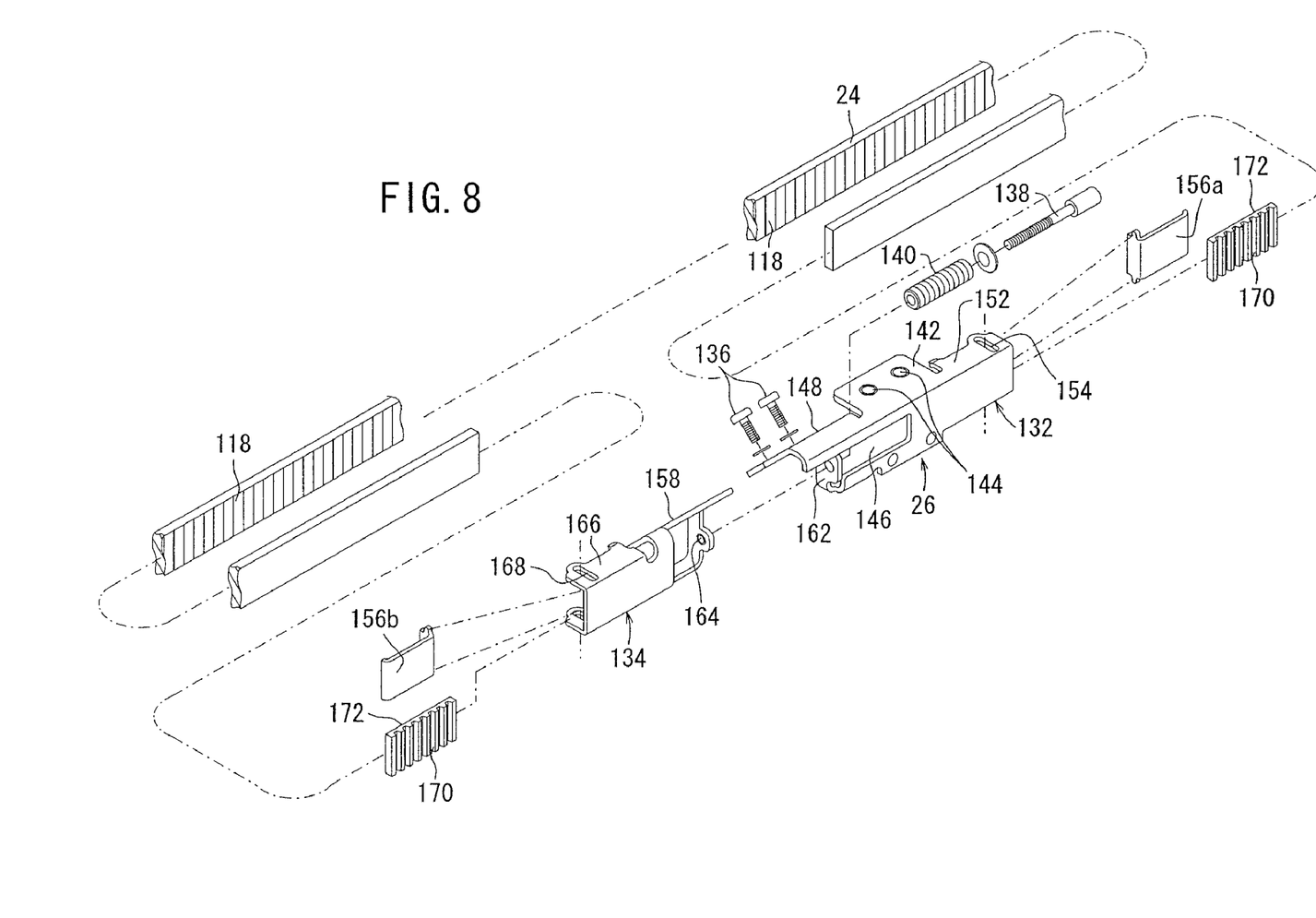
FIG. 8 is an exploded perspective view illustrating the belt-adjusting mechanism shown in FIG. 5.

As shown in FIG. 5, a pair of magnets 120 are installed on end portions of the yoke 100 and disposed on a side of the driving section 18. The magnets 120 are disposed to face both side surfaces of the yoke 100. When the yoke 100 is displaced in the axial direction together with the slider 20, positions of the magnets 120 are sensed by the position-detecting sensor that is installed on the frame 12. Accordingly, the displacement positions of the yoke 100 and the slider 20 can be detected.

A pair of guide members (guide sections) 36a, 36b are installed on both side surfaces of the yoke 100, so that the guide members (guide sections) 36a, 36b protrude respectively toward the guide grooves 34a, 34b of the frame 12. Each of the guide members 36a, 36b is formed from a resin material, and the guide members 36a, 36b are fixed by pairs of bolts 110 through collars 108. More specifically, the timing belt 24 is inserted at a substantially central portion of the yoke 100 through the belt hole (hole) 114, wherein the pair of guide members 36a, 36b are disposed on outer sides thereof in the widthwise direction. In other words, by means of the yoke 100, the guide members 36a, 36b and the timing belt 24 are arranged substantially in parallel in a horizontal direction within the bore section 30 of the frame 12 (see FIG. 4).

When the yoke 100 is inserted into the bore section 30, the guide members 36a, 36b enter into the guide grooves 34a, 34b of the frame 12. The cross-sectional shape of each of the guide members 36a, 36b includes a first flat surface section 124, which abuts against the vertical surface 38 of each of the guide grooves 34a, 34b, a pair of second flat surface sections 126, which abut against the horizontal surfaces 40 of each of the guide grooves 34a, 34b, and inclined sections 128, each of which are separated a predetermined distance from the inclined surfaces 42 of the respective guide grooves 34a, 34b. The inclined sections 128 are formed and positioned substantially in parallel to the respective inclined surfaces 42 of the guide grooves 34a, 34b. Specifically, the guide members 36a, 36b are supported by the guide grooves 34a, 34b of the frame 12 via the first and second flat surface sections 124, 126, whereby the guide members 36a, 36b are guided by the guide grooves 34a, 34b in the axial direction of the frame 12 when the yoke 100 is displaced integrally together with the slider 20.

The timing belt 24 runs over and between the driving pulley 22, which is connected to the rotary driving source 74, and the driven pulley 68, which is rotatably supported by the second end block 16. A plurality of parallel teeth 118, separated from each other at predetermined intervals, are formed on an inner circumferential surface of the timing belt 24. The parallel teeth 118 mesh with the driving pulley 22 and the driven pulley 68 respectively, thus permitting the timing belt 24 to orbit.

As shown in FIGS. 5 to 8, the belt-adjusting mechanism 26 includes a first body 132, which is connected to an inner wall surface of the yoke 100 through attachment bolts 130, and a second body 134, which is displaceable in the axial direction with respect to the first body 132. The belt-adjusting mechanism 26 further includes lock screws 136, which engage with and fix the second body 134 with respect to the first body 132, an adjusting screw 138 that is threaded at a substantially central portion of the first body 132 for adjusting a spacing distance between the first body 132 and the second body 134 in accordance with a screwing amount thereof, and a spring 140 that urges the second body 134 toward the first body 132.

The first body 132 is composed of, for example, a plate-shaped member processed by press working. An attachment section 142, which extends in the horizontal direction, is formed at an upper portion of the first body 132. Two holes 144 are formed in the attachment section 142, through which the attachment bolts 130 are inserted. The belt-adjusting mechanism 26 is fixed to an inner side surface of the yoke 100 by means of the attachment section 142. An installation hole 146 is formed in the axial direction on one side surface of the first body 132, wherein the adjusting screw 138 and the spring 140 are arranged in the installation hole 146.

The first body 132 has a lock screw attachment section 148, which is formed at one end disposed on the side of the second body 134, and which is inclined downwardly at a predetermined angle. A slotted hole 150 is formed in the axial direction in a substantially central portion thereof.

A pair of first engaging holes 154 for receiving a first attachment flange section 152 are formed respectively at the other end of the first body 132. One lock plate 156a constituting the belt-fixing mechanism 28 is rotatably supported by the first engaging holes 154.

The second body 134 is formed by press working a plate-shaped member, in the same manner as the first body 132. An attachment surface 158, which is inclined at approximately the same angle as the angle of inclination of the lock screw attachment section 148 of the first body 132, is formed at one end on a side of the first body 132. The attachment surface 158 is arranged on a lower side of the lock screw attachment section 148.

The attachment surface 158 is formed with two screw holes 160 therein, which are separated from each other by a predetermined distance, such that the lock screws 136 that are inserted into the slotted hole 150 can engage therewith. The attachment surface 158 is arranged such that the axis of the slotted hole 150 is coaxial with a center line connecting the two screw holes 160.

The second body 134 is provided with a screw-engaging section 164, which is opposed to a support section 162 of the first body 132. The adjusting screw 138, which is inserted into the support section 162, is threaded into the screw-engaging section 164.

A pair of second engaging holes 168 are formed respectively for receiving a second attachment flange section 166 disposed at the other end of the second body 134. The other lock plate 156b constituting the belt-fixing mechanism 28 is rotatably supported by the second engaging holes 168.

The belt-fixing mechanism 28 connects the ends of the timing belt 24 to the ends of the first body 132 and the second body 134, which together constitute the belt-adjusting mechanism 26. The belt-fixing mechanism 28 is composed of meshing members 172, which are arranged on the other side end of the first body 132 and on the other side end of the second body 134, respectively. The meshing members 172 comprise meshing grooves 170, corresponding to the parallel teeth 118 of the timing belt 24. The belt-fixing mechanism 28 further includes a pair of lock plates 156a, 156b, which are supported rotatably with respect to the first body 132 and the second body 134, respectively, and which fix the ends of the timing belt 24 by means of the meshing members 172.

The meshing members 172 have meshing grooves 170, which are adapted to the parallel teeth 118 of the timing belt 24. The meshing members 172 are installed on both ends of the timing belt 24 respectively, so that the meshing grooves 170 mesh with the parallel teeth 118.

The lock plates 156a, 156b are supported rotatably by the first and second engaging holes 154, 168 of the first and second bodies 132, 134. The ends of the timing belt 24 including the meshing members 172 are interposed between the first and second bodies 132, 134, whereby the timing belt 24 is fixed to the first and second bodies 132, 134.

That is, both ends of the timing belt 24 are fixed to the belt-adjusting mechanism 26 by means of the belt-fixing mechanism 28, and are connected to the yoke 100 through the aid of the belt-adjusting mechanism 26.

More specifically, the first body 132 and the second body 134 can be displaced relatively in the axial direction by screwing the adjusting screw 138, which constitutes the belt-adjusting mechanism 26. The timing belt 24, which is connected to the first and second bodies 132, 134, can be loosened or tensioned by the belt-fixing mechanism 28 in order to adjust the tensile force thereof. The lock screws 136 are tightened to regulate the relative displacement of the first body 132 and the second body 134 in a state in which the timing belt 24 is adjusted to have a desired tensile force by means of the belt-adjusting mechanism 26. Accordingly, the timing belt 24 is retained in a state in which the tensile force thereof is adjusted.

The electric actuator 10 according to the embodiment of the present invention is basically constructed as described above. Next, operations, functions and effects thereof shall be explained.

At first, an electric signal (for example, a pulse signal) is supplied to the driving section 18 from an unillustrated power source. The rotary driving source 74 is rotated on the basis of the electric signal, thereby rotating the driving pulley 22 that is disposed on the base member 62.

The driven pulley 68 of the frame 12 is integrally rotated by the timing belt 24, under a driving action of the driving pulley 22. Accordingly, the yoke 100 is displaced in the axial direction inside the bore section 30 while being guided by the guide grooves 34a, 34b, together with the belt-adjusting mechanism 26 to which the timing belt 24 is connected. The slider 20 also is displaced in the axial direction along the frame 12 together with the yoke 100. During this operation, the seal belt 44, which closes the slit 32 of the frame 12, is opened by one guide surface 104 under a displacement action of the slider 20. Further, the open seal belt 44 is guided by the other guide surface 104 and the belt-holding section 112, so as to approach the frame 12 again, whereby the slit 32 is closed.

More specifically, the slider 20 is displaced in the axial direction along the frame 12 while the slit 32 remains sealed by the seal belt 44 to thereby close the bore section 30.

In this situation, the yoke 100 is displaced while effecting sliding movement of the pair of guide members 36a, 36b, which are installed on the yoke 100, with respect to the guide grooves 34a, 34b of the frame 12. In particular, sliding movement is performed such that the first flat surface sections 124 of the guide members 36a, 36b abut against the vertical surfaces 38 of the guide grooves 34a, 34b, and the second flat surface sections 126 of the guide members 36a, 36b abut against the horizontal surfaces 40 of the guide grooves 34a, 34b. The pair of inclined surfaces 42 and the inclined sections 128 remain separated from each other by predetermined spacing distances, and hence they make no contact with each other.

The magnet 120, which is installed on the yoke 100, is sensed by a position-detecting sensor (not shown) installed in the sensor attachment groove 48 of the frame 12. Accordingly, the displacement position of the slider 20 is detected together with the yoke 100.

On the other hand, when the polarity of the electric signal supplied from the power source (not shown) is reversed, the rotary driving source 74 rotates in a direction opposite to that described above. The slider 20, which is connected to the timing belt 24 through the yoke 100, is displaced in the axial direction along the frame 12. Also in this case, the yoke 100 is displaced with respect to the guide grooves 34a, 34b while being guided in the axial direction under an engaging action of the guide members 36a, 36b *in the same manner as described above.*

As described above, in the embodiment of the present invention, the cylindrical yoke 100 is inserted into the bore section 30 of the frame 12, and the yoke 100 and the slider 20 are connected to one another via the slit 32 of the frame 12. The timing belt 24, which transmits the driving force from the driving section 18, is inserted into the belt hole 114 of the yoke 100. Further, the timing belt 24 is fixed in the belt hole 114 through the belt-adjusting mechanism 26. When the timing belt 24 is inserted into the belt hole 114 of the yoke 100, as described above, the widthwise dimension of the frame 12 including the yoke 100 therein is not increased. Therefore, it is possible to suppress an increase in size in the widthwise dimension of the electric actuator 10, including the frame 12.

The guide members 36a, 36b that guide the slider 20 and the timing belt 24 are arranged substantially in parallel within the bore section 30 of the frame 12. Therefore, it also is possible to suppress the height dimension of the frame 12.

As described above, it is possible to suppress dimensions in both the widthwise direction and the height direction of the frame 12 in which the yoke 100 and the timing belt 24 are inserted. Therefore, the entire electric actuator 10 can be made small in size.

The guide members 36a, 36b can also be provided on both side surfaces of the yoke 100 opposed to the guide grooves 34a, 34b of the frame 12 without being affected by the arrangement of the timing belt 24, because the timing belt 24, which is disposed substantially in parallel, is accommodated within the yoke 100. Therefore, the pair of guide members 36a, 36b are provided on both side surfaces while being disposed on the outermost sides of the yoke 100, and furthermore, the guide members 36a, 36b engage with the guide grooves 34a, 34b of the frame 12 such that the slider 20 is guided displaceably in the axial direction. Accordingly, for example, even when a momental force (external force) is exerted on the slider 20 in the rotational direction, about the center of the axis of the slider 20, the slider 20 can still be displaced reliably and smoothly in the axial direction of the frame 12.

In other words, the pair of guide members 36a, 36b can be arranged in the bore section 30, on outer sides in the widthwise direction, with the yoke 100 intervening therebetween. Therefore, it is possible to improve load resistance in the momental direction of the slider 20 connected to the yoke 100.

Although certain preferred embodiments of the present invention have been shown and described in detail, it should be understood that various changes and modifications may be made therein without departing from the scope of the appended claims.

What is claimed is:

1. An electric actuator for transmitting a driving force of a driving section to a displacement member via a driving force-transmitting belt, said electric actuator comprising:
    said driving section, which is driven in accordance with an electric signal;
    a hollow frame to which said driving section is connected;
    said displacement member, which is provided displaceably in an axial direction of said frame; and
    a guide member comprising a tubular yoke having an internal hole therein that extends axially through said tubular yoke for insertion of said driving force-transmitting belt, said guide member being connected to said displacement member and being guided displaceably in said axial direction within said frame,
    wherein said guide member includes guide sections, which are guided with respect to said frame, said guide sections being arranged at positions deviated toward said frame as compared with said driving force-transmitting belt inserted into said hole,
    wherein said driving force transmitting belt and said guide sections outside of said yoke are located at the same height, and
    wherein said guide sections are provided on both lateral side surfaces of said guide member extending in said axial direction respectively, said guide sections abut against and engage in surface-to-surface sliding contact with grooves provided and formed in respective inner side walls of said frame, and said drive force-transmitting belt is trained around two respective pulleys, each of said pulleys being supported on rotary shafts that extend in a vertical direction.

2. The electric actuator according to claim 1, wherein each of said guide sections has a first flat surface section, which is formed at a side portion of said guide section, a pair of second flat surface sections, which are formed perpendicularly to said first flat surface section, and inclined sections, which are formed between said first flat surface section and said second flat surface sections and which are inclined at predetermined angles with respect to said first flat surface section.

3. The electric actuator according to claim 2, wherein each of said grooves has a vertical surface formed on each of sides of both side surfaces of said frame, a pair of horizontal surfaces disposed substantially perpendicular to said vertical surface, and inclined surfaces, which are formed between said vertical surface and said horizontal surfaces and which are inclined at predetermined angles with respect to said vertical surface.

4. The electric actuator according to claim 3, wherein said first flat surface sections abut in sliding contact against said vertical surfaces, said second flat surface sections abut in sliding contact against said horizontal surfaces, and said inclined sections and said inclined surfaces are separated from each other by predetermined spacing distances.

5. The electric actuator according to claim 1, further comprising an adjusting mechanism, which is capable of adjusting a tensile force of said driving force-transmitting belt, wherein respective ends of said driving force-transmitting belt are connected to said adjusting mechanism, and said adjusting mechanism is accommodated in said hole together with said driving force-transmitting belt.

6. The electric actuator according to claim 1, wherein said internal hole has a substantially rectangular shape in cross section, a widthwise dimension from one side to another side of said driving force-transmitting belt being less than a lengthwise dimension of said internal hole.

7. The electric actuator according to claim 5, wherein said adjusting mechanism is connected to an inner wall surface of said tubular yoke inside said hole.

* * * * *